United States Patent
Grabski

(12) 
(10) Patent No.: US 10,480,717 B2
(45) Date of Patent: Nov. 19, 2019

(54) SYSTEM AND DEVICE FOR MONITORING CONTENTS OF GAS CYLINDERS OR COMPRESSED LIQUIFIED GAS CYLINDERS

(71) Applicant: Roy J. Grabski, Bennington, NY (US)

(72) Inventor: Roy J. Grabski, Bennington, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 655 days.

(21) Appl. No.: 15/150,920

(22) Filed: May 10, 2016

(65) Prior Publication Data

US 2017/0328521 A1 Nov. 16, 2017

(51) Int. Cl.
| | | |
|---|---|---|
| F17C 13/02 | (2006.01) | |
| F17C 1/00 | (2006.01) | |
| F17C 13/04 | (2006.01) | |
| G01L 19/12 | (2006.01) | |

(52) U.S. Cl.
CPC .............. *F17C 13/025* (2013.01); *F17C 1/00* (2013.01); *F17C 13/04* (2013.01); *G01L 19/12* (2013.01); *F17C 2201/0104* (2013.01); *F17C 2205/0323* (2013.01); *F17C 2205/05* (2013.01); *F17C 2221/013* (2013.01); *F17C 2250/043* (2013.01); *F17C 2260/021* (2013.01); *F17C 2270/02* (2013.01)

(58) Field of Classification Search
CPC ...... F17C 13/025; F17C 13/02; F17C 13/028; G01L 19/083; G01L 19/12
See application file for complete search history.

(56) References Cited

U.S. PATENT DOCUMENTS

| | | | | |
|---|---|---|---|---|
| 3,593,582 A | * | 7/1971 | Birkmeyer | G01L 19/12 200/81.8 |
| 4,275,393 A | * | 6/1981 | Johnston | G01L 19/12 250/231.11 |
| 4,536,756 A | * | 8/1985 | DePasquale | G08B 21/182 340/626 |
| 4,906,977 A | * | 3/1990 | Huey-Jeng | G01L 19/12 137/557 |
| 2005/0056106 A1 | * | 3/2005 | Nelson | G01D 11/24 73/866.3 |
| 2006/0038695 A1 | * | 2/2006 | Isaacs | G01L 19/12 340/688 |
| 2009/0050218 A1 | * | 2/2009 | Burgess | F17C 13/06 137/557 |
| 2016/0109312 A1 | * | 4/2016 | Dyson | G01L 19/16 73/733 |
| 2016/0245426 A1 | * | 8/2016 | Fowler | F16K 37/005 |

* cited by examiner

*Primary Examiner* — Steven A. Reynolds
*Assistant Examiner* — Javier A Pagan
(74) *Attorney, Agent, or Firm* — Robert J. Hampsch

(57) ABSTRACT

A system and device for monitoring the content of a gas/liquid or gas only containment vessel such as a cylinder is provided. The disclosed apparatus is easily affixed to a standard gas cylinder and configured to monitor the pressure of the cylinder contents and activate a visual and/or audio alarm when the contents of the gas/liquid cylinder are no longer in a liquid or partially liquid state as well as activate another visual and/or audio alarm at a prescribed pressure when the contents of the cylinder are nearing depletion.

14 Claims, 3 Drawing Sheets

SYSTEM AND DEVICE FOR MONITORING CONTENTS OF GAS CYLINDERS OR COMPRESSED LIQUIFIED GAS CYLINDERS

FIELD OF THE INVENTION

The present invention relates to an apparatus for monitoring the content of a gas only or a gas/liquid containment vessel, and more particularly to an apparatus that is easily affixed to a standard gas cylinder wherein the apparatus monitors the pressure of the cylinder contents and activates a visual and audio alarm at a prescribed pressure when the contents of the cylinder are no longer in a liquid or partially liquid state. In addition to monitoring the contents of a compressed gas cylinder or gas/liquid containment vessel, the apparatus also functions as a handle or grasp so as to easily lift or maneuver the cylinder.

BACKGROUND

Gas cylinders are widely used in medical and industrial settings for the dispensing of compressed liquefied gas such as nitrous oxide or carbon dioxide, etc. In a compressed liquefied state, certain gases (e.g. nitrous oxide or carbon dioxide, etc.) exist in the cylinder in two phases, namely liquid phase and gas phase. In this two phase state, the gas pressure of the system is generally dependent on the temperature and independent of the liquid volume in the cylinder. During usage of the cylinder, there will come a time when the liquid within the cylinder is consumed. At this point, the remaining gas pressure in the cylinder is dependent on gas volume such that as the volume of gas within the cylinder decreases so does the pressure. Compressed gas cylinders typically include a mechanical or electronic manometer to alert the user as to the pressure of the compressed gas within the cylinder and thus the volume of remaining gas within the cylinder. Such mechanical or electronic manometers are of little use when the contents of the cylinder are a compressed liquefied gas or two phase fluid.

Users of a compressed liquefied gas need to know the contents of the containment vessel and when the contents are nearing or at a depleted condition. Prior art systems used to monitor compressed liquefied gases or two phase fluids would employ liquid level measurement technologies to accurately determine the compressed liquefied gas contents of such cylinders. Unfortunately, such liquid level measurement technologies are more costly and complex than the standard mechanical or electronic manometers, and often dependent of the orientation of the cylinder or vessel. Thus, there is an ongoing need to provide a simple, inexpensive apparatus that alert users of a compressed liquefied gas to when the contents of the cylinder are nearing or at a depleted condition.

SUMMARY OF THE INVENTION

The present invention may be characterized as an a cylinder content indicator device for monitoring contents of a containment vessel configured to hold a fluid in a compressed liquid state, the cylinder content indicator device comprises: (i) a housing body configured to be affixed to a valve that is operatively coupled to the containment vessel; (ii) a pressure gauge dispose in the housing body and capable of detecting the pressure of the contents of the containment vessel when the device is attached to the valve that is operatively coupled to the containment vessel and displaying the pressure of the contents of the containment vessel in analog or digital form; and (iii) an electronics assembly attached to the housing body and operatively connected to the pressure gauge and capable of producing an electronic alarm to signify audibly, visibly, or both audibly and visibly when the pressure of the contents of the containment vessel, as detected by the pressure gauge, falls below one or more predetermined threshold pressure values; wherein at least one of the predetermined threshold pressure values is a pressure at which the fluid in the containment vessel is no longer in a compressed liquid state.

In a preferred embodiment, the cylinder content indicator device is affixed to the valve with the use of a clamp plate assembly affixed to the housing body in a manner that surrounds the valve. In addition, the cylinder content indicator device preferably uses rechargeable batteries to provide power to the electronics assembly and may include another electronic alarm to signify audibly, visibly, or both audibly and visibly when the power level of the batteries falls below one or more predetermined threshold power levels.

The present invention may also be characterized as a cylinder content indicator system comprising: (i) a containment vessel having pressurized contents in a compressed liquid state; (ii) a valve operatively coupled to the containment vessel and configured to controllably close or open a passageway for the flow of gas from the containment vessel through the valve; and (iii) a cylinder content indicator device coupled to the valve and in fluid communication with the pressurized contents of the containment vessel, the cylinder content indicator device comprising a pressure gauge dispose in operative association with the valve and capable of detecting the pressure of the contents of the containment vessel and displaying the pressure of the contents of the containment vessel in analog or digital form, and preferably analog form. The cylinder content indicator device further comprises an electronics assembly operatively connected to the pressure gauge and capable of producing an electronic alarm to signify audibly, visibly, or both audibly and visibly when the pressure of the contents of the containment vessel, as detected by the pressure gauge, falls below one or more predetermined threshold pressure values, wherein at least one of the predetermined threshold pressure values is a pressure at which the pressurized contents in the containment vessel is no longer in a compressed liquid state.

The present embodiments may also be characterized as a cylinder content indicator device for monitoring contents of a containment vessel configured to hold a compressed gas or a fluid in a gas/liquid state, the cylinder content indicator device preferably comprises: (i) a housing body configured to be affixed to a valve that is operatively coupled to the containment vessel, the housing body having an upper surface and a substantially flat lower surface and defining a body width that is greater than the width of the valve and less than the width of the containment vessel; (ii) a pressure gauge dispose in the housing body and capable of detecting the pressure of the contents of the containment vessel when the device is attached to the valve that is operatively coupled to the containment vessel and displaying the pressure of the contents of the containment vessel in analog or digital form; and (iii) an electronics assembly attached to the housing body and operatively connected to the pressure gauge and capable of producing an electronic alarm to signify audibly, visibly, or both audibly and visibly when the pressure of the contents of the containment vessel, as detected by the pressure gauge, falls below one or more predetermined threshold pressure values. The housing body is affixed to the pin indexed valve and extends in a lateral orientation from the valve and forms a grasp configured to lift or maneuver the containment vessel or gas cylinder.

In various embodiments, the electronics assembly is a front panel electronics assembly forming a visible forward facing surface of the cylinder content indicator device. In such embodiments, the front panel electronics assembly further comprises one or more integrated membrane switches and an integrated printed circuit board with surface mount components. Also, the electronic alarm is preferably a visual indication that the pressure of the contents of the containment vessel, as detected by the pressure gauge, is below the predetermined threshold pressure value corresponding to a pressure at which the fluid in the containment vessel is in a totally gaseous state or is no longer in the liquid or partially liquid state.

The present invention is particularly suitable for use with compressed liquefied gas cylinders, such as cylinder of carbon dioxide or nitrous oxide. When used with a cylinder of nitrous oxide, the electronic alarm may be a visual indication that the pressure of the nitrous oxide within the cylinder is below the vapor pressure at the present temperature (e.g. about 600 psig for nitrous oxide at about 60 degrees Fahrenheit) thus indicating that the cylinder contents is no longer in the compressed liquid state. Another electronic alarm would be a visual indication and an audible indication that the pressure of the nitrous oxide within the cylinder is in a gaseous state (e.g. below 350 psig or 300 psig for nitrous oxide at about 60 degrees Fahrenheit) and that the cylinder is nearing an empty or depleted condition. In addition, many applications of nitrous oxide also require use of compressed oxygen gas to be delivered concurrently with the nitrous oxide, preferably using a dual cylinder arrangement, a first cylinder for the gas/liquid nitrous oxide and a second cylinder for the compressed oxygen gas. The present cylinder content indicator device is suitable for use on both cylinders of such dual cylinder arrangements.

BRIEF DESCRIPTION OF THE DRAWINGS

While the specification concludes with claims specifically pointing out the subject matter that Applicant regards as the invention, it is believed that the invention will be better understood when taken in connection with the accompanying drawings in which:

DETAILED DESCRIPTION

Figure 1:
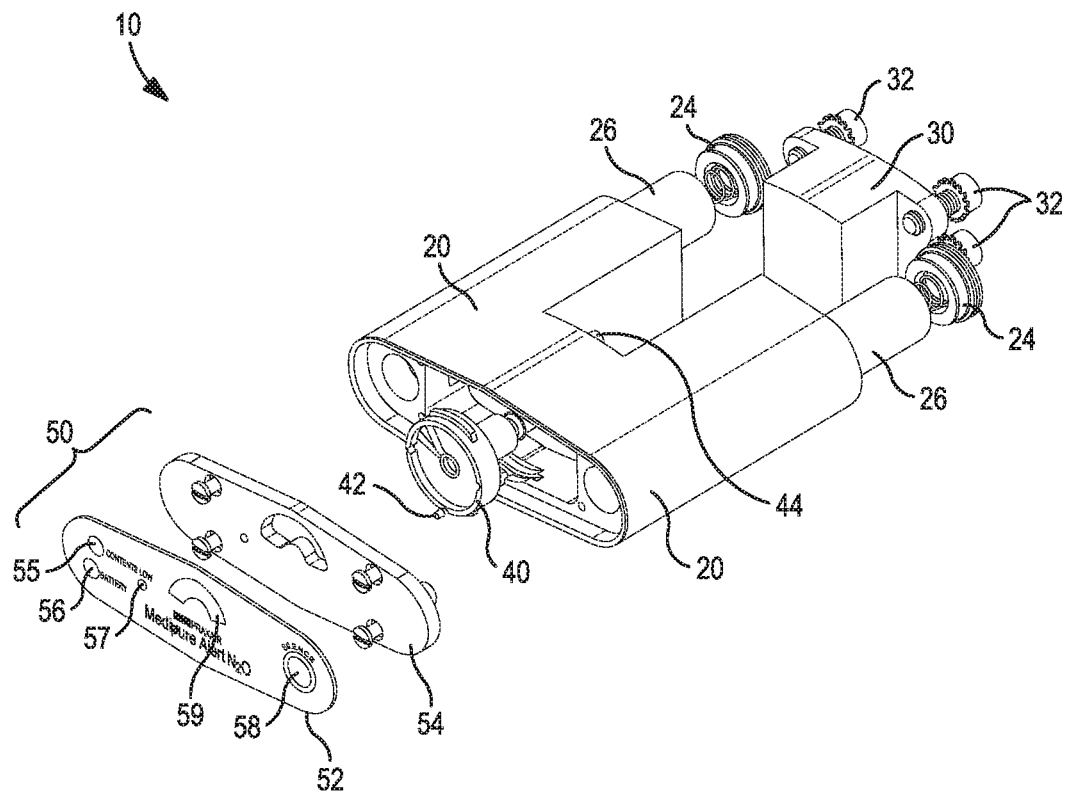
FIG. 1 is an exploded perspective view the cylinder content indicator device in accordance with an embodiment of the present invention.
Figure 2:
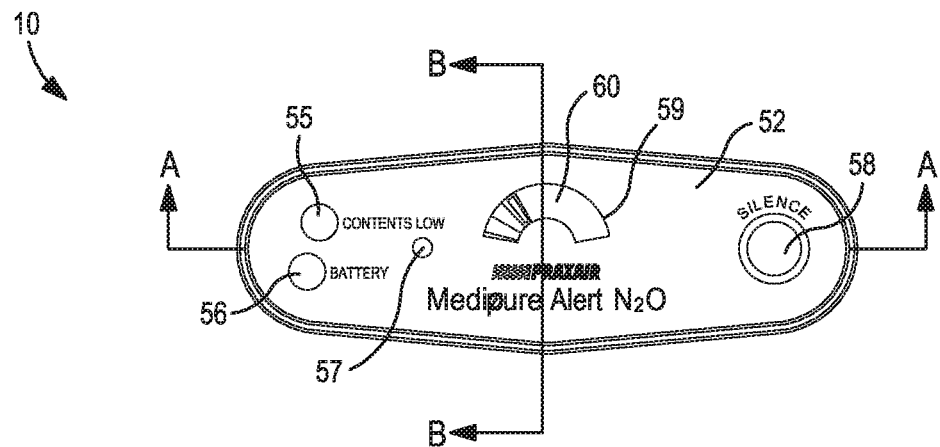
FIG. 2 is a front plan view of the embodiment of the device shown in FIG. 1.
Figure 3:
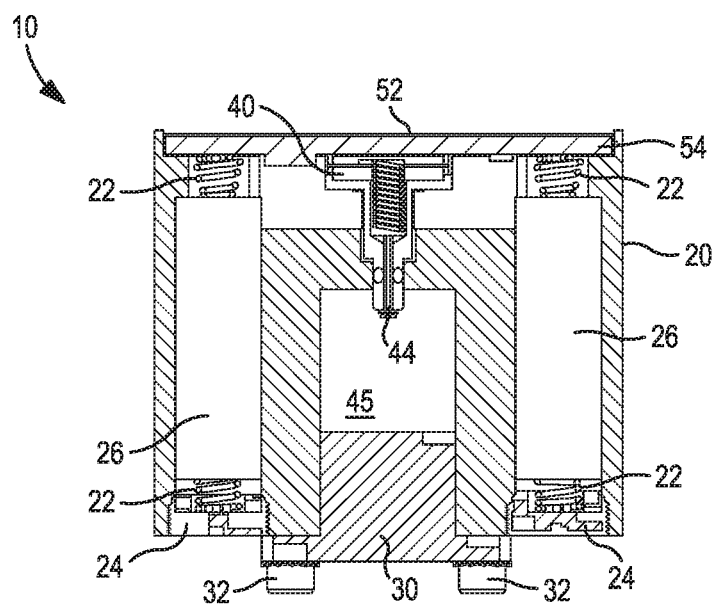
FIG. 3 is a cross-sectional view of the embodiment of the device shown in FIG. 1 taken along line A-A.
Figure 4:
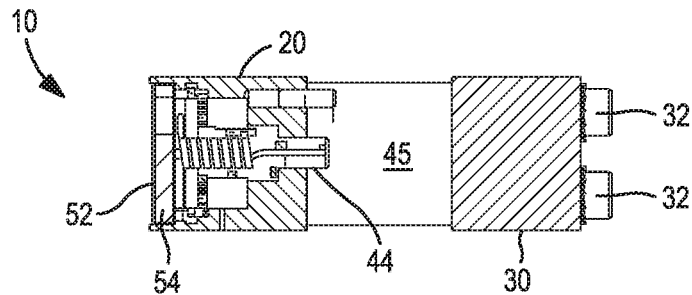
FIG. 4 is a cross-sectional view of the embodiment of the device shown in FIG. 1 taken along line B-B.
Figure 6:
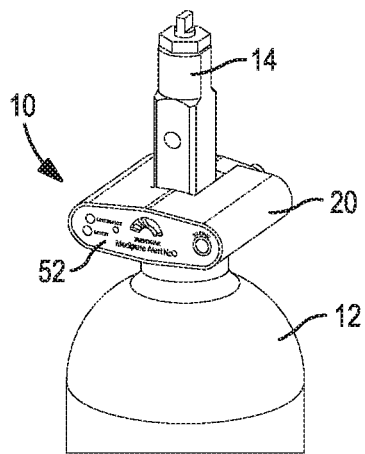
FIG. 6 is a perspective view of the embodiment of the device of FIG. 1 as attached to the regulator valve at the top of a cylinder.
Figure 5:
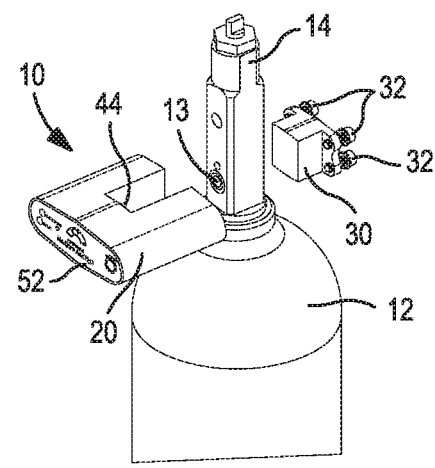
FIG. 5 is a partially exploded perspective view of an embodiment of the device of the present invention as attached to the regulator valve at the top of a cylinder.

Turning to the figures, and specifically FIGS. 1 through 6, there is shown a cylinder content indicator device 10. As seen therein, the device includes a body 20, a clamp plate assembly 30, a pressure gauge 40 and a front panel electronics assembly 50. As shown in FIG. 5 and FIG. 6, the device 10 is preferably coupled to and integrated with a valve 14, preferably a CGA pin indexed valve that is operatively coupled to and disposed on a cylinder 12 or other pressurized containment vessel. The device 10 and pressure gauge 40 are further configured to align with an orifice 13 on the valve 14 so as to be in fluidic communication with the contents of the cylinder 12 or other pressurized containment vessel.

As seen in FIGS. 1 and 3-6, the housing body 20 is preferably a strong, lightweight and impact resistant nickel plated aluminum housing. The physical dimensions of the housing body 20 and device 10 are selected so as to ensure the profile of the device 10 does not exceed the outer diameter (OD) of cylinder 12 and does not interfere with the intended operation of the valve 14. Preferably, the housing body 20 has an upper surface and a substantially flat lower surface defining a body width and length that are greater than the width of the valve and less than the width or diameter of the containment vessel. The clamp plate assembly 30 is configured to attach to the back of the housing body 20 using a plurality of screws 32 arranged to affix the clamp plate assembly 30 to the housing body 20 in a manner that surrounds the valve 14 as shown in FIGS. 5 and 6. Advantageously, when the device 10 is affixed to the valve 14 and cylinder 12, the housing body 20 and clamp provides a handle, grasp or other convenient means to hold, maneuver or lift the gas cylinder 12.

The housing body 20 or housing further includes one or more cavities configured to receive one or more 3.6V AA sized rechargeable lithium batteries 26 and associated battery cap assemblies 24 and electrical contacts 22. Power to the device 10 is provided by the rechargeable batteries 26. Although not shown in the figures, the rechargeable batteries 26 may be recharged while disposed within the device 10 by means of an integrated solar cell or through a charging interface or receptacle disposed on the housing body 20 that operatively couples the rechargeable batteries to a battery charging station or source via a wired connection or via direct contact. The battery charging station or source may recharge the batteries directly or inductively.

The device 10 preferably uses a 'C' shaped Bourdon tube, direct drive pressure gauge or a helical Bourdon tube, direct drive pressure gauge 40 or a disposed in direct communication with the contents in the cylinder 12 or other pressurized containment vessel. In particular, the proximal end of the pressure gauge 40 includes a fitting or coupling 44 that extends from the housing body 20 into a recessed space 45 that is dimensioned to accommodate the valve 14. The proximal end of the pressure gauge 40 is further configured to engage the orifice of the valve 14 and, when engaged, to open a flow path between pressure gauge 40 and the cylinder 12. As the pressure changes within the cylinder 12, pressure gauge 40 responds and a needle of the pressure gauge 40 moves relative to a stationary scale 60. Thus, at a given pressure within the cylinder 12, the needle of the pressure gauge 40 will be positioned at a particular location on the stationary scale 60 indicative of that cylinder pressure. The stationary scale 60 is preferably printed on a forward facing, non-ferrous distal end surface 46 of the pressure gauge 40. The pressure gauge 40 also includes an alignment pin 42 disposed at or near a forward facing, distal end surface 46 of pressure gauge 40. The alignment pin 42 ensures precise alignment between the stationary scale 60 of the pressure gauge 40 and the front panel electronics assembly 50.

The front panel electronics assembly 50 comprises a front panel 52 and an underlying electronics board 54. The front panel 52 is a scratch resistant, clear, durable plastic layer with printed graphics and one or more indicator windows or ports. In particular, the front panel 52 includes a button 58 that when depressed is configured to silence any audible alarms activated by the electronics board 54. The front panel 52 also includes a first visual indicator port 55 that illuminates when the contents of the cylinder 12 low as determined by the pressure gauge 40 and electronics board 54 as well as a second visual indicator port 56 for a low battery condition as determined by the batteries 26 and the electronics board 54. An audio or sound aperture 57 is also located on the front panel 52 through which the audio indicators or alarms are emitted. The front panel 52 further includes a window 59 or opening to provide visibility to the stationary scale 60 on the forward facing, non-ferrous distal end surface 46 of pressure gauge 40. As illustrated, the preferred device 10 displays the pressure gauge reading together with any visual indicators as well as provides any audio indicators. By viewing the front panel 52, a user is able to read the cylinder content information directly from the gauge.

The electronics board 54 is preferably a laminated construction and includes one or more integrated membrane switches and an integrated printed circuit board with surface mount components. The electronics board 54 may further include an adhesive gasket which forms a seal with the housing body 20 of the device 10 to prevent water ingress into the device 10. The electronics board 54 also includes an on-board microcontroller. The microcontroller takes input from the pressure gauge 40 or other contacts actuated by a user to access functionality of the device 10, such as, power control, alarm control, built in test actuation, status actuation, device configuration, etc. In the preferred embodiment, the pressure gauge 40 interfaces with the microcontroller via one or more electrical contacts, at least one of which is actuated by movement of the needle across the stationary scale 60. When actuated, the electrical contacts will cause the microcontroller on the electronics board 54 to produce audio and/or visual indications or alarms. One such audio or visual indication (i.e. alarm) occurs when the cylinder contents are low as determined when the pressure within the cylinder 12, as measured by the pressure gauge 40, falls below a predetermined threshold. Another such audio or visual indication (i.e. alarm) occurs when the battery power is low.

The preferred audio indications or alarms may be produced by a speaker, piezo device or similar component disposed on the electronics board 54. The preferred visual indications or alarms will be provided by a colored light source, such as a light emitting diode (LED) or combination of LEDs also disposed on the electronics board 54. Bi-color or multi-color LEDs can be used for the visual indication associated with the battery such that when the battery power level is acceptable, the LED displays a green or flashing green color and when the battery power level is low and preferably below a predetermined threshold, the LED displays a red color or flashing red color. Similarly, multi-color LEDs can also be used for the visual indications associated with the cylinder contents such that when the cylinder pressure is above a first prescribed threshold (e.g. 600 psig), the LED displays a green color and when the cylinder pressure is below the first prescribed threshold (e.g. 600 psig) but above a second prescribed threshold (e.g. 300 psig), the LED displays a yellow color and when the cylinder pressure is below the second prescribed threshold (e.g. 300 psig), the LED displays a red color.

Although not shown, the preferred device may also include 'Bluetooth' capability or other wireless communication technologies to allow the device 10 to connect with nearby or remote devices to convey and/or display the cylinder content status and any alarm conditions on such nearby or remote devices. In medical cylinder applications, such communications would preferably be compliant or example with ISO/IEEE 11073-30300, "Health informatics—Point-of-care medical device communication—Part 30300, et seq. Such wireless communications incorporated within the device would preferably be configured with power saving features, so as to minimize power usage and preserve the battery life.

Figure 7:
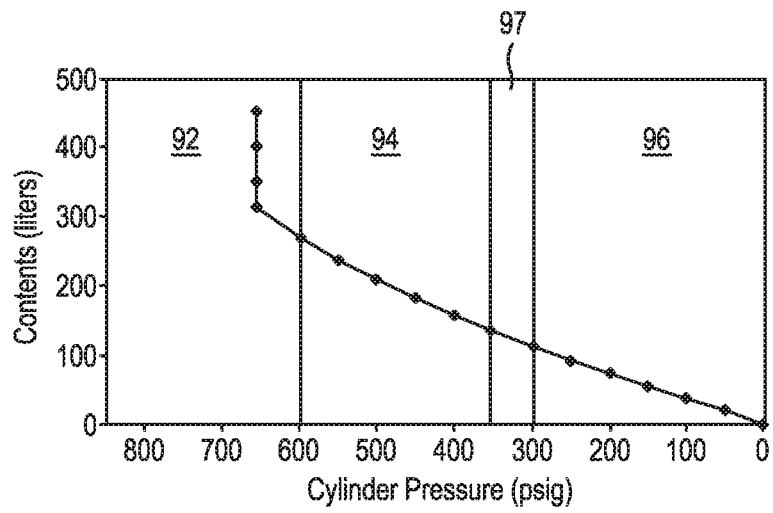
FIG. 7 is a graph depicting cylinder pressure in psig versus cylinder content in liters for nitrous oxide at 60 degrees Fahrenheit in a standard 'E' size cylinder.

Turning now to FIG. 7, there is shown is a graph depicting cylinder pressure in psig versus cylinder content in liters for nitrous oxide at 60 degrees Fahrenheit containing in a standard 'E' size cylinder. When filled, the cylinder contains nitric oxide in a two phase state. As such, the cylinder pressure will remain somewhat constant at a given temperature until the liquid phase within the cylinder has completely evaporated. Only when the contents of the cylinder are in a completely gaseous state, the pressure within the cylinder is dependent on the volume of gas within the cylinder. During usage of the cylinder, the disclosed cylinder contents indicator or device 10 will indicate the contents of the cylinder as acceptably full in region 92 where the cylinder pressure is at or above a first prescribed pressure (e.g. 600 psig), which is at or near the point when the cylinder contents is in a two phase state. In region 92, the two phase state of the cylinder contents is transitioning to a gas-only state. In region 94 the pressure within the cylinder is now dependent on the volume of gas within the cylinder. In region 94, the cylinder contents indicator or device 10 will produce a visual indication that the contents of the cylinder is running low as the cylinder pressure is below the first prescribed threshold (e.g. 600 psig) but above a second prescribed threshold (e.g. 300 psig to 350 psig). In region 97, the cylinder pressure is within the second prescribed threshold limits (e.g. 300 psig to 350 psig) and the cylinder contents indicator or device 10 will produce a visual indication and audio warning that the cylinder contents are dangerously low and that the cylinder should be replaced. In region 96, the cylinder pressure is below the second prescribed threshold (e.g. 300 psig) and the cylinder contents indicator or device 10 will produce a visual indication and audio warning that the cylinder needs to be replaced.

While the present invention has been described with reference to a preferred embodiment and features, it is understood that numerous additions, changes and omissions to the disclosed device may be made without departing from the spirit and scope of the present invention as set forth in the appended claims.

What is claimed is:

1. A cylinder content indicator device for monitoring contents of a containment vessel configured to hold a fluid in a gas/liquid state, the cylinder content indicator device comprises:

a housing body configured to be affixed to a valve that is operatively coupled to the containment vessel;

a pressure gauge disposed in the housing body and capable of detecting the pressure of the contents of the containment vessel when the device is attached to a valve that is operatively coupled to the containment vessel;

a display configured for displaying the pressure of the contents of the containment vessel in analog or digital form and whether the contents of the containment vessel are a liquefied gas in a two phase state, including a liquid phase and a gaseous phase or whether the contents of the containment vessel are in a gaseous only phase; and an electronics assembly attached to the housing body and operatively connected to the pressure gauge and the display;

wherein the electronics assembly is configured for determining whether the contents of the containment vessel are the liquefied gas in the two phase state or whether the contents of the containment vessel are in a gaseous only phase based on the pressure and temperature of the contents of the containment vessel;

wherein the electronics assembly is further configured to produce an electronic alarm to signify audibly, visibly, or both audibly and visibly when the contents of the containment vessel are in the gaseous only phase based on the pressure and temperature of the contents of the containment vessel; and wherein the electronics assembly is still further configured to produce an electronic alarm to signify audibly, visibly, or both audibly and visibly when the contents of the containment vessel are in the gaseous only phase and the pressure of the contents of the containment vessel, as detected by the pressure gauge, falls below one or more predetermined threshold pressure values indicative of a near empty or depleted condition.

2. The device of claim 1 wherein the electronics assembly is a front panel electronics assembly forming a visible forward facing surface of the cylinder content indicator device, the front panel electronics assembly further comprising one or more integrated membrane switches and an integrated printed circuit board with surface mount components.

3. The device of claim 1 further comprising a clamp plate assembly attached to a back of the housing body and together with the housing body affixes the cylinder content indicator device to the valve that is operatively coupled to the containment vessel.

4. The device of claim 1 wherein the display is configured for displaying the pressure of the contents of the containment vessel is displayed in analog form and displaying when the contents of the containment vessel are in the two phase state using a visually green indication, and when the contents of the containment vessel are in a gaseous only phase using a yellow or red indication.

5. The device of claim 1 further comprising:
one or more batteries to provide power to the electronics assembly; and
another electronic alarm to signify audibly, visibly, or both audibly and visibly when the power level of the one or more batteries falls below one or more predetermined threshold power levels.

6. A cylinder content indicator system comprising:
a containment vessel configured to hold pressurized contents in a two phase state, including a liquid phase and a gaseous phase;
a valve operatively coupled to the containment vessel and configured to controllably close or open a passageway for the flow of gas from the containment vessel through the valve;
a cylinder content indicator device coupled to the valve and in fluid communication with the pressurized contents of the containment vessel, the cylinder content indicator device comprising:

(i) a pressure gauge disposed in operative association with the valve and capable of detecting the pressure of the contents of the containment vessel;

(ii) a display configured for displaying the pressure of the contents of the containment vessel in analog or digital form and whether the contents of the containment vessel are a liquefied gas in the two phase state, including a liquid phase and a gaseous phase or whether the contents of the containment vessel are in a gaseous only phase; and (iii) an electronics assembly attached to the housing body and operatively connected to the pressure gauge and the display;

wherein the electronics assembly is configured for determining whether the contents of the containment vessel are in the two phase state or whether the contents of the containment vessel are in a gaseous only phase based on the pressure and temperature of the contents of the containment vessel;

wherein the electronics assembly is further configured to produce an electronic alarm to signify audibly, visibly, or both audibly and visibly when the contents of the containment vessel are in the gaseous only phase based on the pressure and temperature of the contents of the containment vessel; and wherein the electronics assembly is still further configured to produce an electronic alarm to signify audibly, visibly, or both audibly and visibly when the contents of the containment vessel are in the gaseous only phase and the pressure of the contents of the containment vessel, as detected by the pressure gauge, falls below one or more predetermined threshold pressure values indicative of a near empty or depleted condition.

7. The system of claim 6 wherein the physical dimensions characterizing the width of the cylinder content indicator device does not exceed the outer diameter of the pressurized gas cylinder.

8. The system of claim 6 wherein the cylinder content indicator device coupled to the valve extends in a lateral orientation from the valve and forms a grasp configured to lift or maneuver the pressurized gas cylinder.

9. The system of claim 6 wherein the electronics assembly is a front panel electronics assembly forming a visible forward facing surface of the cylinder content indicator device, the front panel electronics assembly further comprising one or more integrated membrane switches and an integrated printed circuit board with surface mount components.

10. The system of claim 6 wherein the cylinder content indicator device further comprises:
a housing body configured for housing the pressure gauge and electronics assembly; and
a clamp plate assembly attached to a back of the housing body;
wherein the clamp plate assembly and the housing body affixes the cylinder content indicator device to the valve that is operatively coupled to the containment vessel.

11. The system of claim 6 wherein the display is configured for displaying the pressure of the contents of the containment vessel in analog form and displaying when the contents of the containment vessel are in the two phase state using a visually green indication, and when the contents of the containment vessel are in a gaseous only phase using a yellow or red indication.

12. The system of claim 6 wherein the contents of the containment vessel is carbon dioxide.

13. The system of claim 6 wherein the contents of the containment vessel is nitrous oxide.

14. The system of claim 6 wherein the cylinder content indicator device further comprises:
   one or more batteries to provide power to the electronics assembly; and
   another electronic alarm to signify audibly, visibly, or both audibly and visibly when the power level of the one or more batteries falls below one or more predetermined threshold power levels.

* * * * *